US008733463B2

(12) United States Patent
Meier

(10) Patent No.: US 8,733,463 B2
(45) Date of Patent: May 27, 2014

(54) HYBRID CARGO FIRE-SUPPRESSION AGENT DISTRIBUTION SYSTEM

(75) Inventor: Oliver C. Meier, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 107 days.

(21) Appl. No.: 13/011,924

(22) Filed: Jan. 23, 2011

(65) Prior Publication Data

US 2012/0186835 A1 Jul. 26, 2012

(51) Int. Cl.

| | |
|---|---|
| ***A62C 3/08*** | (2006.01) |
| ***A62C 3/07*** | (2006.01) |
| ***A62C 37/36*** | (2006.01) |
| ***A62C 35/11*** | (2006.01) |
| ***A62C 35/13*** | (2006.01) |
| ***B64D 45/00*** | (2006.01) |

(52) U.S. Cl.
USPC .................. 169/46; 169/60; 169/61; 169/62; 244/129.2

(58) Field of Classification Search
USPC ........... 169/11, 12, 16, 43, 46, 53, 56, 60, 61, 169/62; 244/129.2
See application file for complete search history.

(56) References Cited

U.S. PATENT DOCUMENTS 4,643,260 A * 2/1987 Miller ............................ 169/46
5,038,867 A * 8/1991 Hindrichs et al. .............. 169/62
6,513,602 B1 * 2/2003 Lewis et al. ..................... 169/84
2002/0007954 A1 * 1/2002 Grabow .......................... 169/53
2004/0020665 A1 * 2/2004 Gupta ............................. 169/46
2005/0115721 A1 * 6/2005 Blau et al. ......................... 169/5
2005/0115722 A1 * 6/2005 Lund et al. ........................ 169/5
2005/0139366 A1 * 6/2005 Scheidt ........................... 169/60
2005/0183869 A1 * 8/2005 Lazzarini ........................ 169/54
2007/0007019 A1 * 1/2007 Wierenga et al. ............... 169/30

FOREIGN PATENT DOCUMENTS

EP 1199087 A2 4/2002
EP 1306108 A1 5/2003
WO 00/41769 A1 7/2000
WO 2006/138733 A2 12/2006

OTHER PUBLICATIONS

PCT/US/2011/052909—International Search Report and Written Opinion of the International Searching Authority, Jul. 18, 2012.

* cited by examiner

*Primary Examiner* — Darren W Gorman

(74) *Attorney, Agent, or Firm* — Ameh IP; Elahe Toosi; Lowell Campbell

(57) ABSTRACT

A hybrid cargo-fire-suppression agent distribution system and method is disclosed. The hybrid cargo-fire-suppression agent distribution system comprises vehicle ducting means operable to distribute at least one fire-suppression agent. Further, preliminary fire-suppression supply source means is coupled to the vehicle ducting means and is operable to provide a high volume flow of a preliminary fire-suppression agent.

20 Claims, 5 Drawing Sheets

HYBRID CARGO FIRE-SUPPRESSION AGENT DISTRIBUTION SYSTEM

FIELD

Embodiments of the present disclosure relate generally to fire suppression. More particularly, embodiments of the present disclosure relate to fire-suppression methods usable for fire-suppression agent distribution.

BACKGROUND

Fire-suppression may refer to a use of agents such as gases, liquids, solids, chemicals and mixtures thereof to extinguish combustion. Fire-suppression systems may use a "total flooding" or a "non-total flooding" method to apply an extinguishing agent in an enclosed volume. The total flooding or the non-total flooding method may achieve a concentration of the extinguishing agent as a volume percent to air of the extinguishing agent sufficient to suppress or extinguish a fire. Use of environmentally friendly fire-suppression agents such as environmentally friendly chemical agents or inert gases are being encouraged as a replacement for Halon in fire-suppression systems. However, some of these gaseous systems may require significantly higher volumetric flow rates and thereby systems with higher volume and weight than existing Halon-type fire-suppression agent delivery systems. In airplane operations, higher volume can reduce revenue generating cargo volume and increase weight, which is undesirable since fuel burn rates increase accordingly.

For cargo fire suppression, a cargo fire-suppression agent Halon 1301 has generally been distributed into a cargo compartment (cargo bay) via dedicated distribution systems. Such dedicated distribution systems are generally optimized for flow rates that discharge Halon 1301 in a high pressure liquid for a High Rate Discharge, and in a gaseous phase for a Low Rate (or metered) Discharge.

In an aircraft application, each cargo compartment may have its own dedicated distribution system comprising tubes routed to nozzles in the cargo bay. The nozzles may be mounted in pans down a centerline of the cargo bay ceiling liner. Fire-suppression systems may be operated automatically by an automatic detection and control mechanism, and/or manually by manual activation of an actuator via a remote switch, a combination thereof, and the like.

To date, aircraft cargo fire-suppression systems generally use Halon 1301 as the fire-suppression agent. Halon is an ozone depleting substance whose production and use has been banned by the Montreal Protocol in the early 1990's. Aviation has had a special use exemption (allowing continued use of Halon) until a suitable replacement is found.

As mentioned above, use of environmentally friendly fire-suppression agents such as environmentally friendly gaseous agents is being encouraged as a replacement for Halon. However, gas discharge volumes for these non-Halon type of suppression systems may require a much higher discharge rate than both liquid discharge volumes and gaseous discharge volumes of Halon 1301. Current Halon-type systems may be limited to low volumetric flow rates of about 150 cubic feet per minute (cfm). Systems that can rely on environmentally friendly gaseous agents or inert gases may require significantly higher volumetric flow rates, on an order of 2000-3000 cfm for an approximate 5000 cubic foot compartment volume, which may be beyond a capability of existing Halon-type fire-suppression agent delivery systems.

The current Halon based systems require a high initial knockdown concentration of fire-suppressant followed by a lower sustained concentration of the fire-suppressant. Current Halon-free cargo fire-suppression systems initially require large volumes of inert gas to be discharged at high mass flow rate followed by low volumes of inert gas to be discharged at low mass flow rate/lower mass flow rate inert gas to be continuously supplied (until landing) to provide an equivalent level of fire fighting performance (compared to Halon 1301). A low mass flow rate inert gas supply may be provided by stored inert gas or an inert gas generator such as a Nitrogen Generation System (NGS); however, the NGS generally cannot in its current design efficiently provide the large volumes of gas at the high mass flow rate needed for high initial knockdown concentration of fire-suppressant.

Limited space is available on aircraft for systems installations. Even at high pressures (about 15 times those currently used for Halon) a comparable non-Halon system may require approximately 10 times a storage space compared to a Halon based system. There is simply not enough free space to install an inert gas based system without sacrificing significant revenue (cargo) volume. Furthermore, current high pressures (e.g., 5,000 psi compared to 360 psi for a Halon system) may require significantly heavier bottles to optimally meet safety and certification requirements (e.g., proof and burst pressure).

This is also a challenge as current Halon based systems are more efficient fire-suppressants than current Halon-free cargo fire-suppression systems from a stored weight and volume perspective. Current Halon based systems generally comprise a dedicated bottle of Halon that stores high pressure Halon and discharges the high pressure Halon at high mass flow rates to meet the initial knockdown requirements. Afterwards a second bottle of Halon is released and slowly metered through a flow restricting device, either an orifice or regulating valve to maintain a lower required sustained concentration. Current inert gas fire-suppression systems are generally not as volume efficient as Halon 1301, which is a reason why no viable Halon-free cargo fire-suppression system has currently been certified and delivered. In current designs, inert gas is stored in high pressure cylinders (e.g., about 5,000 psi working pressure) with shielding to protect from a potential external high pressure loads or puncture, which consumes significant volume and adds significant weight.

SUMMARY

A hybrid cargo fire-suppression agent distribution system and method is disclosed. The hybrid cargo-fire-suppression agent distribution system comprises vehicle ducting means operable to distribute fire-suppression agents. Further, preliminary fire-suppression supply source means is coupled to the vehicle ducting means and is operable to provide a high volume flow of a preliminary fire-suppression gas. Alternatively, a secondary fire-suppression supply source is also coupled to the vehicle ducting means and is operable to provide a low volume flow of a secondary fire-suppression gas for sustained fire-suppression.

A Solid Propellant Gas Generator (SPGG) as a stand-alone or as part of a fire-suppression system supplies an initial High Rate Discharge (HRD) needed to suppress fire. The SPGG may also augment a Nitrogen Generation System (NGS) or other gas supply providing an additional low rate discharge. The SPGG stores the inert gas as a solid propellant until needed, at which time it is converted to gas via combustion. The combustion is configured to burn significantly slower and longer than general purpose solid propellant gas generators. In this manner, significantly less storage space and supply source container weight is required to store fire-suppression agents, thereby improving passenger and aircraft safety (as compared to pressurized tanks). Less weight can also translate to less fuel burn, and less space translates to greater space available for revenue generating passengers or cargo.

In an embodiment, a hybrid cargo fire-suppression agent distribution system comprises vehicle ducting means operable to distribute at least one fire-suppression agent. The system further comprises at least one preliminary fire-suppression supply source means coupled to the vehicle ducting means and operable to provide a high volume flow of a preliminary fire-suppression agent.

In another embodiment, a hybrid cargo fire-suppression agent distribution method for distributing fire-suppression agents provides vehicle ducting means comprising at least one preliminary fire-suppression agent supply source means. The method further distributes a preliminary high volume flow fire-suppression agent from the at least one preliminary fire-suppression agent supply source means.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to fire-suppression techniques, fire suppressants, ducting systems, and other functional aspects of the systems (and the individual operating components of the systems) may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of a practical non-limiting application, namely, aviation cargo hold fire suppression. Embodiments of the disclosure, however, are not limited to such aviation cargo hold applications, and the techniques described herein may also be utilized in other fire-suppression applications. For example but without limitation, embodiments may be applicable to truck cargo hold fire suppression, train cargo hold fire suppression, ship cargo hold fire suppression, submarine cargo hold fire suppression, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
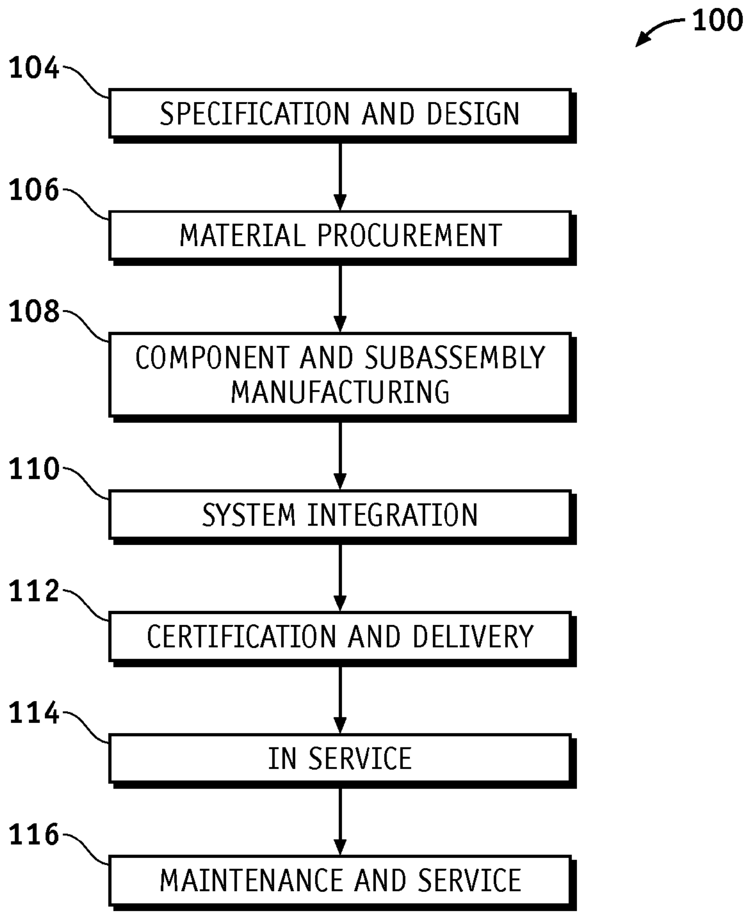
FIG. 1 is an illustration of a flow diagram of an exemplary aircraft production and service methodology.
Figure 2:
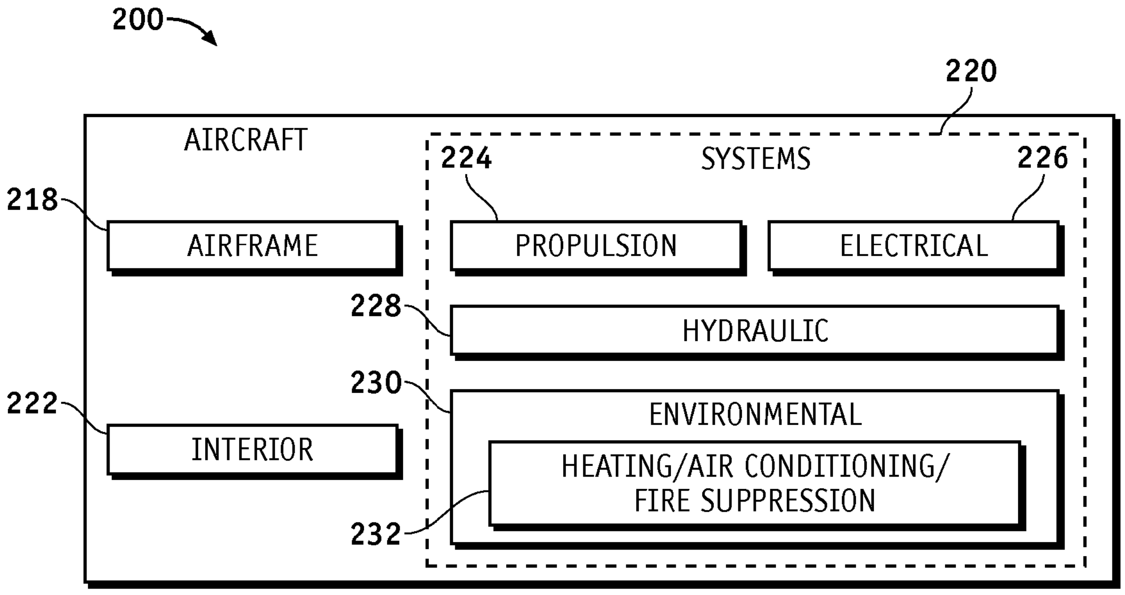
FIG. 2 is an illustration of an exemplary block diagram of an aircraft.

Referring more particularly to the drawings, embodiments of the disclosure may be described in the context of an aircraft manufacturing and service method 100 as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220 and an interior 222. Examples of high-level systems 220 include one or more of a propulsion system 224, an electrical system 226, a hydraulic system 228, and an environmental system 230 comprising a hybrid cargo fire-suppression system hybrid cargo fire-suppression agent distribution system 232 (and air conditioning and heating systems). Any number of other systems may also be included.

Although an aerospace example is shown, the embodiments of the disclosure may be applied to other industries.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. In addition, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Embodiments of the disclosure provide a fire-suppression system comparable in size and weight to Halon 1301 fire-suppression systems that can be used with Halon-type and/or non-Halon-type fire-suppression agents.

The hybrid cargo fire-suppression agent distribution system described herein is a Halon-free cargo fire-suppression system comprising a distribution network. The hybrid fire-suppression system uses a slow-burning Solid Propellant Gas Generator (SPGG) to supply an initial High Rate Discharge (HRD). In one embodiment, the slow-burning SPGG can be used, for example but without limitation, as a stand-alone suppression system for smaller cargo holds on regional jets that do not require a secondary/low rate discharge system, and the like. Alternatively, the SPGG may be used with a slow release inert gas system (e.g., either from a Nitrogen Generation System (NGS) or from stored tanks) for sustained fire-suppression. The SPGG stores at least one inert gas as a solid until it is needed at which time it converts to gas via combustion as explained in more detail below.

The hybrid cargo fire-suppression agent distribution system described herein can replace a traditional stored gas initial discharge/high rate discharge portion of a cargo fire-suppression system with a "tailored" (slow-burning) solid propellant gas generator. The "tailored" (slow-burning) solid propellant gas generator may then augment a low rate discharge system, a traditional stored fire suppressant/inert gas system, and/or an inert gas generator (solid propellant or nitrogen generation type system). The hybrid cargo fire-suppression agent distribution system can make a Halon-free cargo fire-suppression agent distribution system feasible. The hybrid cargo fire-suppression agent distribution system may also provide a cost savings through a reduction in: part count, installation time and avoids some weight penalties.

Figure 3:
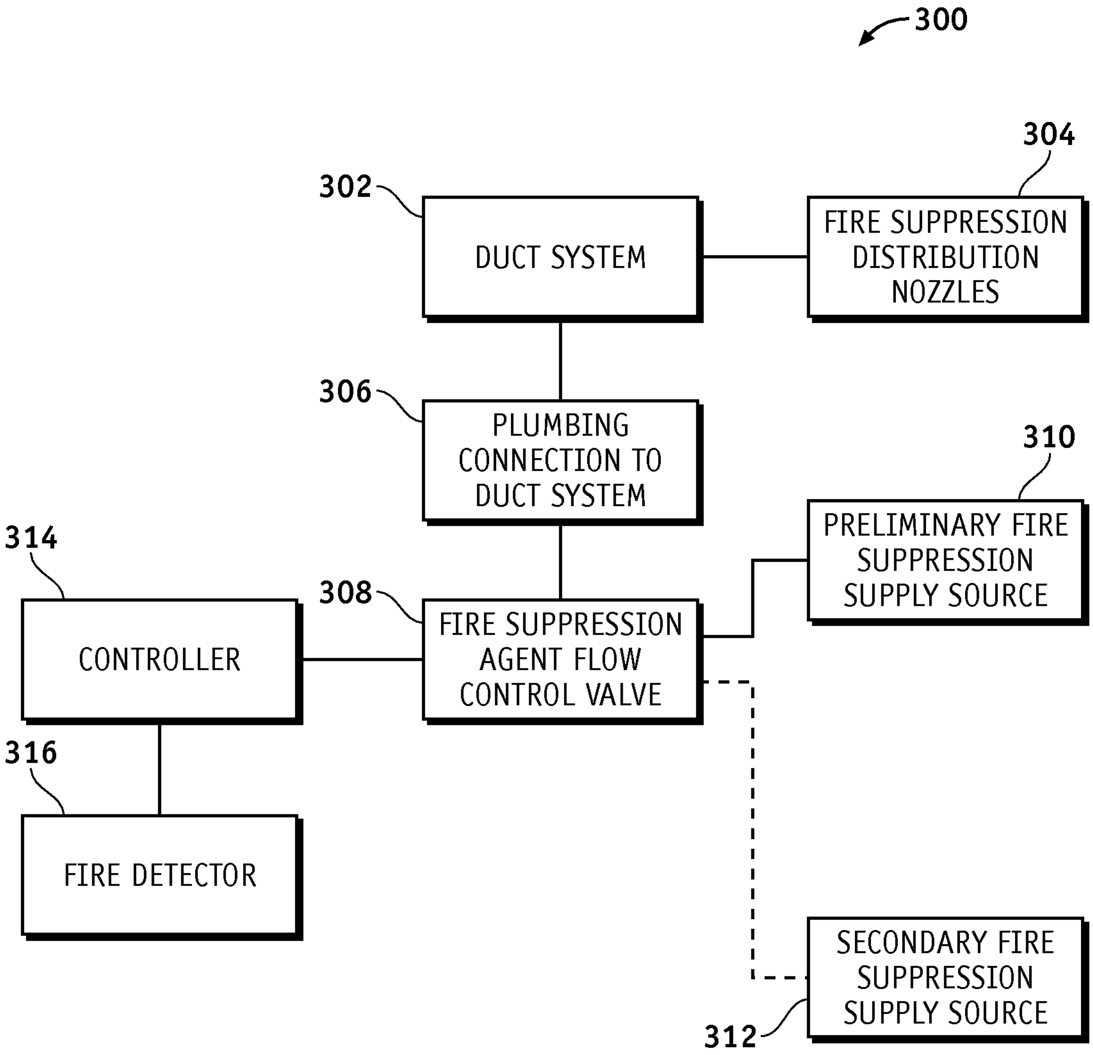
FIG. 3 is an illustration of an exemplary schematic block diagram of a hybrid cargo fire-suppression agent distribution system according to an embodiment of the disclosure.

FIG. 3 is an illustration of an exemplary schematic block diagram of a hybrid cargo fire-suppression agent distribution system 300 (system 300) according to an embodiment of the disclosure. The system 300 uses one or more slow-burning Solid Propellant Gas Generators (SPGGs) to supply an initial High Rate Discharge (HRD). In one embodiment, the SPGGs may be coupled with a slow release inert gas system for sustained fire-suppression. As mentioned above, the SPGGs store the inert gas as a solid until it is needed, at which time it converts into a gas via combustion as explained in more detail below. The system 300 allows delivery of a fire-suppression agent(s) into a contained volume. The contained volume may comprise, for example but without limitation, a cargo bay, a cargo compartment, a passenger bay, an unoccupied contained volume, a cargo compartment, a combination thereof, a contained volume of an aircraft, a contained volume of a truck, a contained volume of a train, a contained volume of a ship, a contained volume of a submarine, a duct system for an occupied area, a duct system for an unoccupied area, and the like. The system 300 delivers the fire-suppression agent into the contained volume from a remotely located fire-suppression agent(s) supply source as explained in more detail below.

The system 300 comprises a duct system 302, one or more distribution nozzles 304, a plumbing connection 306, at least one fire-suppression agent flow-control valve 308, at least one preliminary fire-suppression agent supply source 310, a controller 314, and a fire/smoke detector 316. In one embodiment, the system 300 may also comprise a secondary fire-suppression agent supply source 312 for sustained fire-suppression.

The duct system 302 is coupled to: the distribution nozzles 304, and the preliminary fire-suppression agent supply source 310 through the plumbing connection 306 and the fire-suppression agent flow-control valve 308. The duct system 302 is operable to transport a preliminary fire-suppression agent to the distribution nozzles 304 from the preliminary fire-suppression agent supply source 310 for initial burst fire-suppression.

In one embodiment, the duct system 302 is also coupled to: the secondary fire-suppression agent supply source 312 through the plumbing connection 306 and the fire-suppression agent flow-control valve 308. In this manner, the duct system 302 also transports a secondary fire-suppression agent to the distribution nozzles 304 from the secondary fire-suppression agent supply source 312 for sustained fire-suppression.

Figure 5:
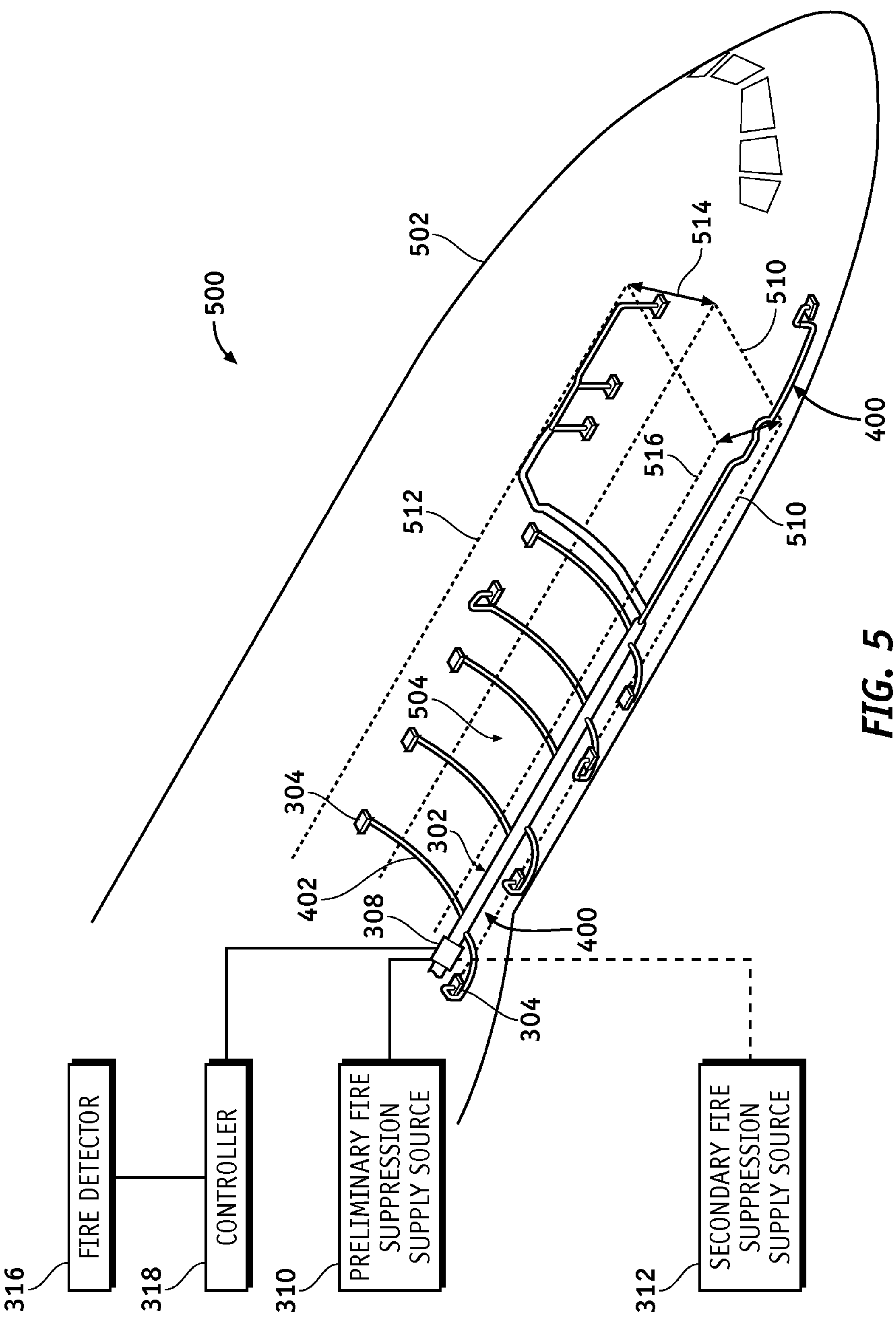
FIG. 5 is an illustration of an exemplary structure of an aircraft cargo compartment comprising a hybrid cargo fire-suppression agent distribution system according to an embodiment of the disclosure.

The distribution nozzles 304 are coupled to the duct system 302 and are configured to distribute fire-suppression agents into a contained volume as explained below. The distribution nozzles 304 may be mounted in sidewalls, floor, ceilings or other locations of the cargo volume 504 (FIG. 5).

The plumbing connection 306 is coupled to the fire-suppression agent flow-control valve 308 and the duct system 302. The plumbing connection 306 is configured to transport and direct a flow of fire-suppression agent from the fire-suppression agent flow-control valve 308 into the duct system 302. The plumbing connection 306 may comprise a flow regulator (not shown) to regulate a flow of fire-suppression agent to a flow rate having a pressure suitable for flowing through the duct system 302. The plumbing connection 306 may comprise, for example but without limitation, metal pipe, plastic pipe, composite pipe, and the like.

The fire-suppression agent flow-control valve 308 is coupled to the preliminary fire-suppression agent supply source 310 and the plumbing connection 306. The fire-suppression agent flow-control valve 308 controls flow of the preliminary fire-suppression agent from the preliminary fire-suppression agent supply source 310 into the plumbing connection 306. In one embodiment, the fire-suppression agent flow-control valve 308 is also coupled to the secondary fire-suppression agent supply source 312 and controls flow of fire-suppression agent from the secondary fire-suppression agent supply source 312 into the plumbing connection 306. The fire-suppression agent flow-control valve 308 is configured to be in an open state or a closed state depending on presence or absence of fire respectively. The fire-suppression agent flow-control valve 308 may comprise, for example but without limitation, a ball valve, a butterfly valve, and the like. The fire-suppression agent flow-control valve 308 may be actuated, for example but without limitation, electronically, via an actuator, via a gear mechanism, in conjunction with one or more components of the system 300, and the like.

An actuator known to those skilled in the art, such as but without limitation, a hydraulic actuator, a piezoelectric actuator, a spring-loaded mechanism tied to the fire-suppression agent flow-control valve 308, and the like, may be used for actuation of the fire-suppression agent flow-control valve 308. In an embodiment, the fire-suppression agent flow-control valve 308 comprises a pyrotechnic valve. A pyrotechnic valve is a valve that opens due to a combustive process and remains open until maintenance replaces the valve. An advantage of the pyrotechnic valve is durability and reliability, and an ability to reliably contain a high pressure for substantially long periods of time until opened.

The preliminary fire-suppression supply source 310 is coupled to the duct system 302 and provides a high volume flow of the preliminary fire-suppression agent. Currently, Halon-free fire-suppression systems require large volumes of inert gas to be stored for the initial High Rate Discharge (HRD) in large compressed gas cylinders. In contrast to gas cylinders, the Solid Propellant Gas Generators (SPGGs) described herein can store the inert gas in a solid form making the inert gas very compact (e.g., about ⅕ the volume of stored gas in gas cylinders), lighter weight and more efficient.

In one embodiment, the preliminary fire-suppression supply source 310 comprises one or more SPGG to supply the initial HRD to provide an increased quantity of gas needed for suppressing a fire. As mentioned above, the SPGG stores the inert gas as a solid until it is needed at which time the SPGG is activated/ignited converting to gas via combustion. An ignition mechanism known to those skilled in the art may be used for activation of the SPGG. For example but without limitation, the SPGG can be ignited by using a small explosive cartridge also know as a squib, and the like.

Current SPGGs discharge too quickly (e.g., in about a 50-200 millisecond timeframe), which may over pressurize a cargo bay, thereby potentially deforming walls of the cargo bay and potentially adversely affecting a fire-suppression in a fire-suppression process. In contrast, an SPGG according to an embodiment the disclosure burns significantly slower and longer than the current SPGGs in order to mimic how a bottle gas would discharge. The SPGG according to an embodiment the disclosure can burn/discharge significantly slower than the current SPGGs, for example but without limitation, in a timeframe of about 1 to 2 minutes.

This slower discharge rate may be accomplished by changing the SPGG chemical formulation or shape of a surface area exposed for combustion. For example, a combustion rate (burn/discharge rate) of the SPGG can vary depending on how much active chemical is present in the SPGG. For another example, the surface area exposed for combustion can vary to change the burn/discharge rate.

In an embodiment, the SPGG temperature is managed via insulating techniques, to protect vehicle structures and components adjacent to the preliminary fire-suppression supply source 310. Fire-suppression tubing may also be revised to allow a high temperature of the inert gas, which current tubing may not withstand or may not be required to withstand since Halon is a refrigerant. In this manner, the SPGG is insulated, reformulated or installed in such a manner as to protect the vehicle/aircraft skin, structure, systems and other features from heat generated by the SPGG. A fire-suppression distribution tubing material comprises any metal or material suitable to maintain the required strength at temperatures of the discharging inert gas.

Also, as the SPGGs store the inert gas in solid state, the inert gas is much denser, and stores more efficiently (e.g., in a smaller space) than in gaseous form. The density of the solid state allows the preliminary fire-suppression supply source 310 to be much smaller/more compact (e.g., about ⅕th the size) than a stored gas system. In this manner, it is much easier to install the system 300 and or the preliminary fire-suppression supply source 310 on a vehicle such as an aircraft. Further, smaller size allows a greater choice of installation locations. Storage in solid state is also advantageous because the fire-suppression agent is unpressurized when stored as compared to about 5,000 psi working pressure for a gaseous system. In this manner, there is no risk of a burst/rupture due to high pressure, thereby not requiring special shielding or protection. Therefore, the preliminary fire-suppression supply source 310 can have thinner/lighter supply source container walls saving significant weight.

For example, a high rate discharge (dump) system for a 2000 $ft^3$ cargo bay would be protected by a Halon 1301 system using a single 1,400 $in^3$ bottle storing Halon at 360 psi (standard day), an inert gas (e.g., Helium or Nitrogen) system would require approximately five 2,600 $in^3$ bottles stored at 5,000 psi to provide an equivalent performance as the Halon system. That is nearly 10 times the volume and 14 times the pressure. An SPGG is unpressurized (until activated) and would require, for example but without limitation, about 2,800 $in^3$ in all. Weight savings may also be significant compared to a stored inert gas based system.

An SPGG configured as described above comprises various advantages as compared to existing systems. For example, as explained above, the SPGG can be, for example but without limitation, about ⅕th smaller (based on volume) than an existing Halon-free gaseous system. Smaller size is important in aviation applications as there is limited space available for airplanes systems since most of the available space is saved for revenue generating passengers or cargo. In addition, it is significantly slower burning/discharging than current SPGGs thereby it does not over pressurize and deform the compartment walls, preventing a non-optimized fire-suppression process. Insulating the SPGG and revising the fire-suppression tubing to withstand the higher temperature of the inert gas (fire-suppression agent) ensures the fire-suppression agent will get to a fire zone, and that the aircraft is not adversely affected in any way during the fire distribution agent discharge. Some additional benefits of storing the gas in solid state are listed below.

The supply source container can be lighter since it doesn't need to be designed to meet the Department of Transportation (DOT) requirements for pressurized cylinders (e.g., proof and burst pressure requirements) that increase the pressure shell wall thicknesses and weights. Weight is an undesirable factor in aircraft design, lighter weight systems means less fuel burn and greater space available for revenue generating passengers or cargo.

The preliminary fire-suppression supply source 310 (e.g., a supply source container) may be much smaller (e.g., volumetrically) for a comparable amount of inert gas and fire-suppression performance. As explained above, storing inert gas in solid state is significantly more efficient than storing the inert gas in gaseous state.

There is also a second order benefit, as special shielding is not required to protect a system such as the system 300 from a potential external high pressure load or puncture. New Federal Aviation Administration (FAA) rules (14 CFR 25.795) require systems to protect against a potential external high pressure load or puncture in the cargo bay. Large high pressure gas cylinders would be vulnerable to this threat and thereby require shielding. An SPGG, according to an embodiment of the disclosure, would not be as susceptible to the external high pressure loads as they are much smaller (e.g., less exposed surface area to the loads) and are unpressurized, so they are more tolerant of impact damage. Not requiring shielding yields less weight, easier installation and easier maintenance.

The secondary fire-suppression agent supply source 310 is configured to transport a secondary fire-suppression agent into the duct system 302 for sustaining suppression of a fire in a contained volume such as the cargo volume 504. The fire-suppression agent may be delivered by, for example but without limitation, a storage vessel containing gaseous fire suppressant, an inert gas generator (e.g., an NGS), and the like.

In one embodiment the secondary fire-suppression agent supply source 312 discharges the secondary fire-suppression agent substantially simultaneously with the at least one preliminary fire-suppression agent supply source 310 discharging the preliminary fire-suppression agent. In another embodiment, the secondary fire-suppression agent supply source 312 discharges the secondary fire-suppression agent at a pre-determined time delay (e.g., about 0 seconds to 90 minutes) after the preliminary fire-suppression agent initial burst is substantially distributed through the contained volume. The secondary fire-suppression agent supply source 310 may be activated by receiving an activation signal from, for example but without limitation, the controller 314 as explained in more detail below.

The secondary fire-suppression agent may comprise, for example but without limitation, gaseous chemical agents such as: HFC-125 or Pentafluoroethane ($CF_3CHF_2$); inert gases and semi-inert gases such as Nitrogen, Argon or Helium; aerosolized liquid mists such as FK 5-1-12 fire protection fluid ($C_6F_{12}O$) (i.e., commercially available from 3M) or water ($H_2O$); Halon 1301 (CF3Br); a mixture thereof; and the like. Accordingly, the secondary fire-suppression supply source 312 may comprise, for example but without limitation: a Nitrogen Generation System (NGS), an HFC-125 supply source, a Pentafluoroethane (CF3CHF2) supply source, a Nitrogen supply source, an Argon supply source, a Helium supply source, an aerosolized liquid mist supply source, a FK 5-1-12 (C6F12O) supply source, a water supply source, a Halon supply source, and the like.

The controller 314 is coupled by an electrical and/or optical signal to the fire detector 316, and the fire-suppression agent flow-control valve 308. The controller 314 is configured to manage/control the fire-suppression agent flow-control valve 308 in accordance with embodiments described herein. The controller 314 may be implemented as, for example but without limitation, part of an aircraft-computing module, a centralized aircraft processor, a subsystem-computing module devoted to the system 300, and the like. The controller 314 may be, for example but without limitation, a software-controlled device, electronic, mechanical, electro-mechanical, fluidic, and the like. The controller 314 may be activated, for example but without limitation, automatically, manually, a combination thereof, and the like. The controller 314 may receive signals indicative of presence or absence of fire/smoke in the cargo volume 504 (FIG. 5) from the fire detector 316.

For example, the controller 314 initiates distribution of fire-suppressant agents in response to receiving a fire-warning signal from fire detector 316 indicating an out of tolerance smoke condition. In this manner, the controller 314 activates the preliminary fire-suppression supply source 310 by sending a signal to an igniter (not shown) to ignite a combustor (not shown) for converting the solid inert gas stored in the preliminary fire-suppression supply source 310 to gaseous state. As mentioned above, in an embodiment, the controller 314 can also send a second activation signal to the secondary fire-suppression agent supply source 310 to initiate sustaining fire-suppression. The second activation signal can be sent substantially simultaneously with discharging/initial burst of the preliminary fire-suppression agent supply source 310, or at the pre-determined time delay after discharging/initial burst of the preliminary fire-suppression agent supply source 310.

In an embodiment, the controller 314 commands an open state in response to receiving the fire-warning signal to open the fire-suppression agent flow control valve 308, thereby allowing distribution of one or more fire-suppression agent. In this manner, the controller 314 sends a signal to the fire-suppression agent flow control valve 308 to close. For example, if the fire detector 316 detects an intolerable amount of fire/smoke in the cargo volume 504, the fire detector 316 sends the fire-warning signal to the controller 314. The controller 314 may then send a signal to an actuator mechanism (not shown) of the fire-suppression agent flow control valve 308 commanding the fire-suppression agent flow control valve 308 to open. The fire-suppression agent flow control valve 308 then changes from a closed position to an open position thereby allowing the one or more fire-suppression agent to flow to and through the plumbing connection 306 and into the duct system 302.

In an embodiment, the controller 314 commands a closed state in response to receiving a fire-suppressed signal, to close the fire-suppression agent flow control valve 308 thereby blocking distribution of the one or more fire-suppression agent. In this manner, when a fire is suppressed, the controller 314 sends a signal to the fire-suppression agent flow control valve 308 to close same. For example, if the fire detector 316 detects no intolerable amount of fire/smoke in the cargo volume 504, the fire detector 316 sends a fire-suppressed signal to the controller 314. The controller 314 may then send a signal to the actuator mechanism (not shown) of the fire-suppression agent flow control valve 308 commanding the fire-suppression agent flow control valve 308 to close. In this manner, the fire-suppression agent flow control valve 308 changes from the open position to the closed position thereby blocking the fire-suppression agents to flow to and through the plumbing connection 306 and into the duct system 302.

In an embodiment, the fire-warning signal and the fire-suppressed signal may be sent to a control panel (not shown) such as a cockpit control panel. In this manner, an operator such as a pilot or another flight crew member can activate the controller 314 manually via a switch, and the like, to remotely open and/or close the fire-suppression agent flow control valve 308 accordingly.

The fire detector 316 is coupled by an electrical and/or optical signal to the controller 318 and configured to detect fire/smoke conditions. The fire detector 316 may comprise a device for detecting fire, such as but without limitation, a smoke sensor, a heat sensor, an infrared sensor, and the like. The fire detector 316 generates a fire-warning signal and a fire-suppressed signal indicating presence and absence of intolerable amount of fire/smoke in a control volume such as the cargo volume 504.

Figure 4:
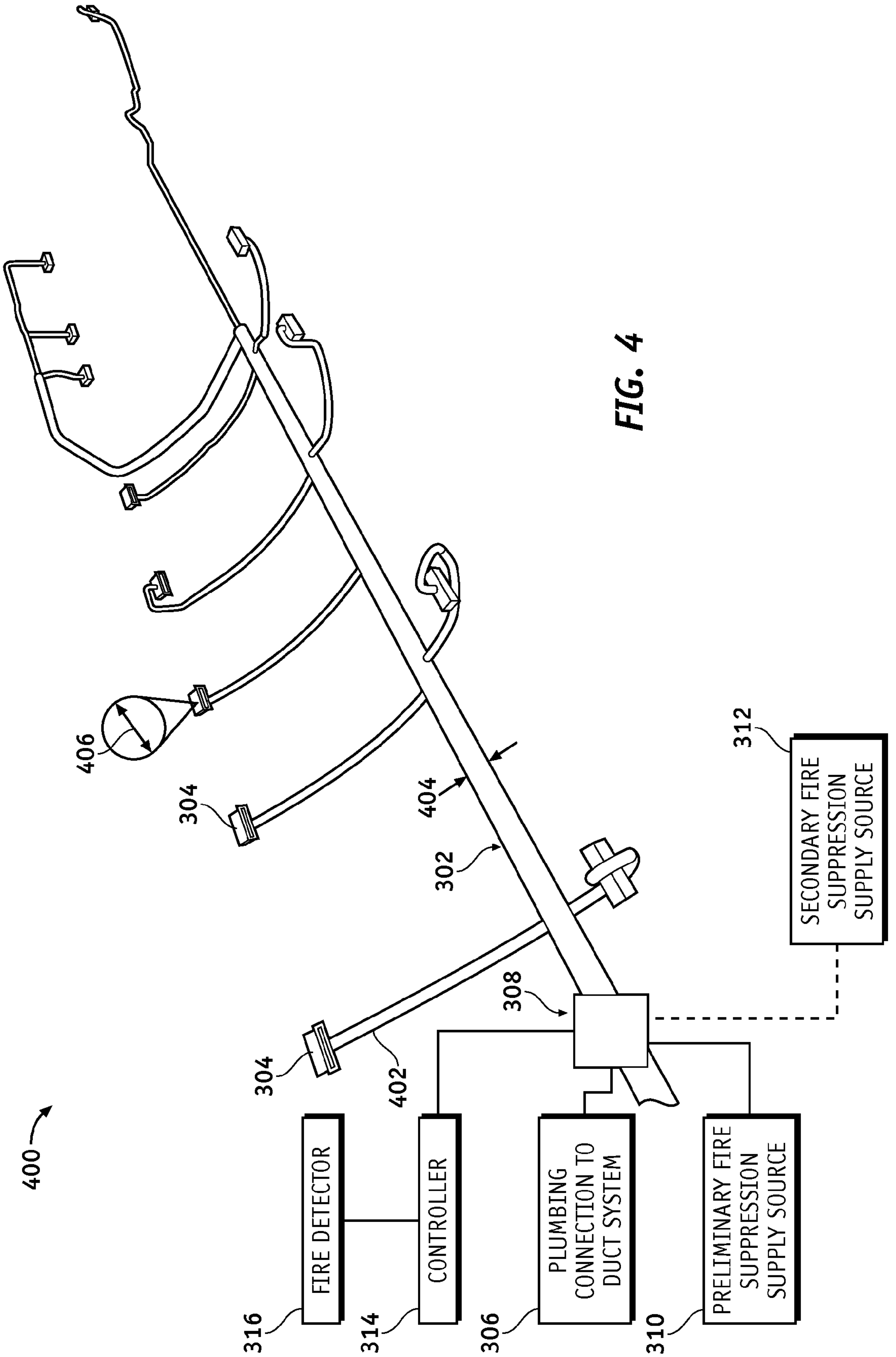
FIG. 4 is an illustration of an exemplary structure of a hybrid cargo fire-suppression agent distribution system according to an embodiment of the disclosure.

FIG. 4 is an illustration of an exemplary structure 400 of a hybrid cargo fire-suppression agent distribution system according to an embodiment of the disclosure. The structure 400 may have functions, materials, and structures that are similar to the embodiments shown in FIG. 3. Therefore common features, functions, and elements may not be redundantly described here. The structure 400 comprises the duct system 302, the one or more distribution nozzles 304, the plumbing connection 306, the fire-suppression agent flow-control valve 308, the preliminary fire-suppression agent supply source 310, the controller 314, and the fire/smoke detector 316.

In one embodiment, the structure 400 may also comprise the preliminary fire-suppression agent supply source 310 augmented by the secondary fire-suppression agent supply source 312 for sustained fire-suppression. However the preliminary fire-suppression agent supply source 310 may be used as a stand-alone fire-suppression supply source.

A shape of ducts of the duct system 302 may be, for example but without limitation, cylindrical with an outer diameter 404 of, for example but without limitation, about 2 inches to about 3 inches, and the like. A shape of the distribution nozzles 304 may be, for example but without limitation, circular having a diameter 406 ranging from, for example but without limitation, about 2 inches to about 7.5 inches, and the like. A shape of the distribution nozzles 304 may also be, for example but without limitation, elliptical, rectangular, and the like. The duct system 302 may be coupled radially to the distribution nozzles 304 via a branch duct 402.

FIG. 5 is an illustration of an exemplary structure 500 of an aircraft cargo volume 504 comprising the hybrid cargo fire-suppression agent distribution system 400 according to an embodiment of the disclosure. The structure 500 may have functions, material, and structures that are similar to the embodiments shown in FIGS. 3-4. Therefore common features, functions, and elements may not be redundantly described here. The structure 500 comprises, an aircraft fuselage 502 enclosing the cargo volume 504 (forward cargo volume 504) comprising the hybrid cargo fire-suppression agent distribution system 400.

In an embodiment, a cargo volume may comprise multiple cargo bays. For example, the structure 500 may comprise an aft cargo volume (not shown) separated by aircraft wings (not shown) from the forward cargo volume 504 in addition to the forward cargo volume 504. With two or more cargo bays, the hybrid cargo fire-suppression agent distribution system 400 is operable to suppress one or more fires whether in the forward cargo volume 504 and/or the aft cargo volume.

In the embodiment shown in FIG. 5 the duct system 302 may be located substantially near the cargo floor 510 at a distance 514 from the ceiling 516. Each branch duct 402 may extend radially from the duct system 302 to any location suitable for operation of the structure 500, for example but without limitation, at least a portion of: the left-side wall 512, the right-side wall (not shown), both the left-side wall 512 and the right-side wall, a front wall (not shown), a back wall (not shown), a hallway (not shown), a compartment coupled to the cargo volume 504 (not shown), a plurality of walls, the ceiling 516, the cargo floor 510, a combination thereof, and the like. The one or more preliminary fire-suppression agent supply source 310 and/or the one or more secondary fire-suppression agent supply source 312 may be installed, for example but without limitation, outside a right-side wall (not shown), and the like.

Distribution nozzles 304 may be installed, for example but without limitation, in a liner (not shown) of the left-sidewall 512, the right-side wall on a side of the forward cargo volume 504, on the ceiling 516, in the cargo floor 510, and the like.

Figure 6:
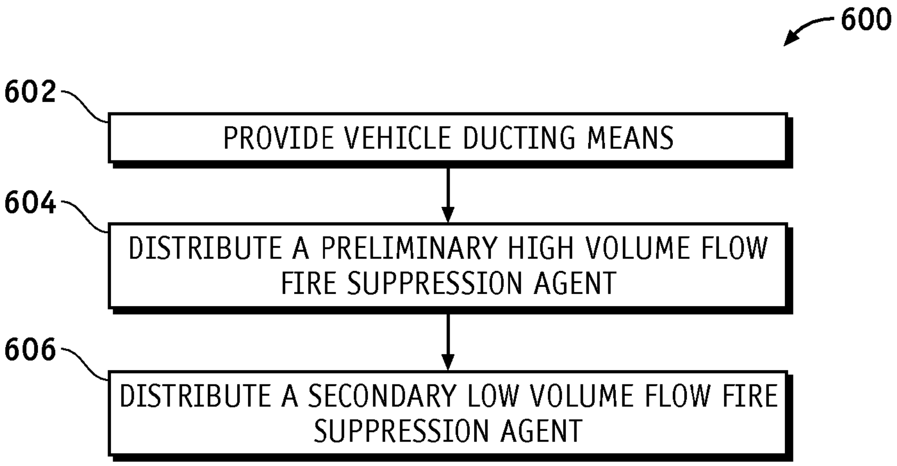
FIG. 6 is an illustration of an exemplary flowchart showing a hybrid cargo fire-suppression agent distribution process according to an embodiment of the disclosure.
Figure 7:
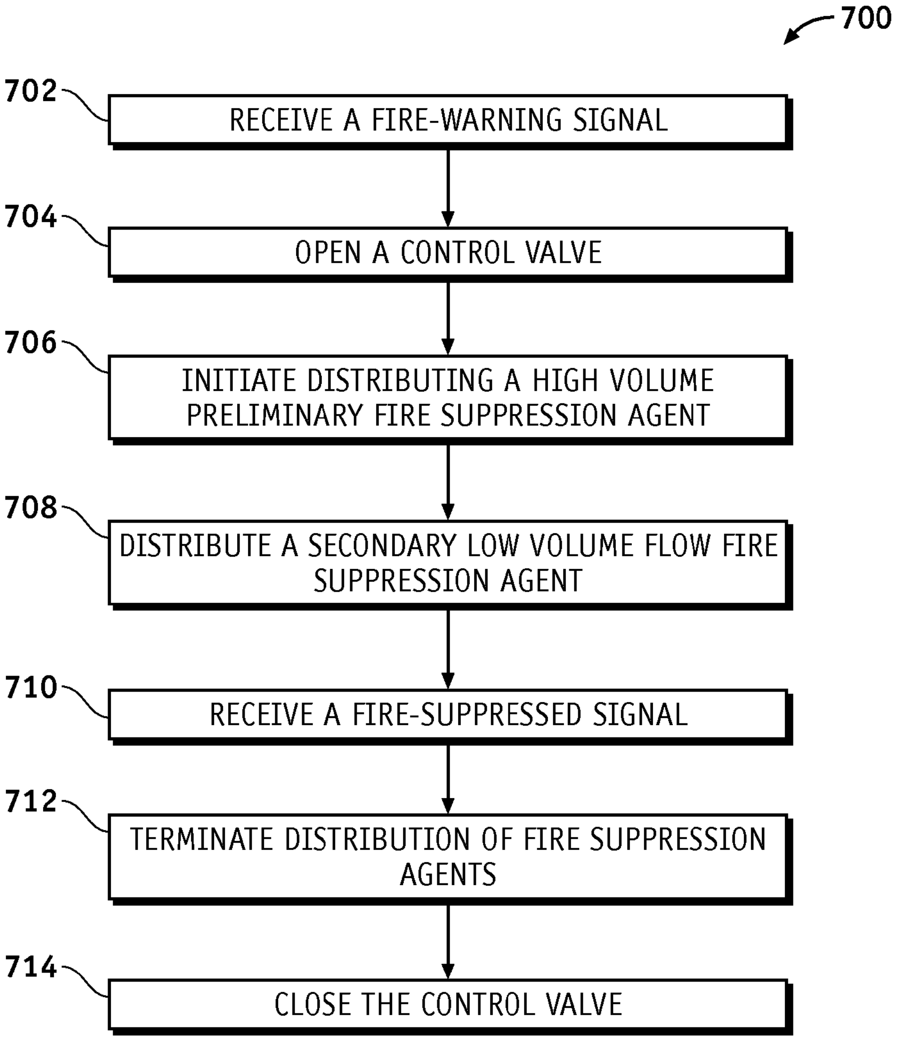
FIG. 7 is an illustration of an exemplary flowchart showing a hybrid cargo fire-suppression agent distribution process according to an embodiment of the disclosure.

FIGS. 6-7 are illustrations of two exemplary flowcharts showing hybrid cargo fire-suppression agent distribution processes 600-700 according to two embodiment of the disclosure. The various tasks performed in connection with processes 600-700 may be performed mechanically, by software, hardware, firmware, or any combination thereof. For illustrative purposes, the following description of processes 600-700 may refer to elements mentioned above in connection with FIGS. 1-5.

In practical embodiments, portions of the processes 600-700 may be performed by different elements of the hybrid cargo fire-suppression agent distribution systems 300 and structures 400-500 such as: the duct system 302, the one or more distribution nozzles 304, the plumbing connection 306, the fire-suppression agent flow-control valve 308, the preliminary fire-suppression agent supply source 310, the secondary fire-suppression agent supply source 312, the controller 314, and the fire/smoke detector 316.

Processes 600-700 may have functions, material, and structures that are similar to the embodiments shown in FIGS. 3-5. Therefore common features, functions, and elements may not be redundantly described here.

FIG. 6 is an illustration of an exemplary flowchart showing the hybrid cargo fire-suppression agent distribution process 600 according to an embodiment of the disclosure.

Process 600 may begin by providing vehicle ducting means (task 602) such as the duct system 302 coupled to at least one preliminary fire-suppression agent supply source 310. As mentioned above, in one embodiment, the duct system 302 may also be coupled to at least one secondary fire-suppression agent supply source 312.

Process 600 may then continue by distributing the preliminary high volume flow fire-suppression agent from the at least one preliminary fire-suppression agent supply source 310 (task 604) such as the slow-burning SPGG through a contained volume such as the cargo volume 504. As mentioned above, in one embodiment, the slow-burning SPGG can be used as a stand-alone fire-suppression supply source.

However, the slow-burning SPGGS may also be coupled with a low rate discharge supply source for sustained fire-suppression. In this manner, the process 600 may then continue by distributing a secondary low volume flow fire-suppression agent from the at least one secondary fire-suppression agent supply source (task 606) through the contained volume.

FIG. 7 is an illustration of an exemplary flowchart showing the hybrid cargo fire-suppression agent distribution process 700 according to an embodiment of the disclosure.

Process 700 may begin by the controller 314 receiving a fire-warning signal (task 702) from the fire detector 316.

Process 700 may then continue by opening the control valve 308 to allow flow of at least one fire-suppression agent in response to the controller 314 receiving the fire-warning signal (task 704). When the controller 314 receives the fire-warning signal, the controller 314 sends a command signal to an actuation mechanism commanding an open state where the control valve 308 is opened. In this manner, the control valve 308 allows the fire-suppression agents to flow into a contained volume such as the contained volume 504. The fire-suppression agents may comprise a high volume flow of the preliminary fire-suppression gas provided by the slow-burning SPGGs for initial fire-suppression. Alternatively, the fire-suppression agents may comprise a high volume flow of the preliminary fire-suppression gas provided by the slow-burning SPGGs for the initial fire-suppression as well as the low volume flow of the secondary fire-suppression gas provided by gas supply sources for sustained fire-suppression.

Process 700 may then continue by the controller 314 initiating distributing a high volume preliminary fire-suppression agent throughout the contained volume (task 706). In this manner, the controller 314 may send a signal to a combustor to convert the solid propellant contained in the preliminary fire-suppression supply source 310 to a gas via burning. As mentioned above, the slow-burning SPGGS can be used as a stand-alone fire-suppression supply source, or can augment a low rate discharge supply source such as the NGS or other gas supplies for sustained fire-suppression.

In this manner, process 700 may then continue by the secondary fire-suppression supply source 312 distributing a low volume secondary fire-suppression agent throughout the contained volume (task 708). As mentioned above, the secondary fire-suppression agent may be distributed simultaneously with, or subsequently after distribution of the preliminary fire-suppression agent.

Process 700 may then continue by the controller 314 receiving a fire-suppressed signal (task 710) from the fire detector 316.

Process 700 may then continue by terminating distribution of the fire-suppression agents in response to the controller 314 receiving the fire-suppressed signal (task 712).

Process 700 may then continue by closing the control valve 308 to block the flow of the fire-suppression agent in response to the controller 314 receiving the fire-suppressed signal (task 714). The controller 314 receives the fire-suppressed signal from the fire detector 316 and sends a command signal to the actuation mechanism to command a closed state where the control valve 308 is closed.

In this way, various embodiments of the disclosure provide a system and method for suppressing fire using a type of Halon-free hybrid cargo fire-suppression agent distribution system. The hybrid cargo fire-suppression agent distribution system uses a slow-burning Solid Propellant Gas Generator (SPGG) that can be used as a stand-alone fire-suppression supply source, thereby saving weight, volume, and installation time. The slow-burning SPGG may alternatively augment an NGS or other gas supply sources that provide a low rate discharge supply source for a sustained fire-suppression. In this manner, an environmentally friendly fire-suppression agent distribution system with reduced weight, complexity and cost is provided.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 3-5 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A hybrid cargo fire-suppression agent distribution system, comprising:

vehicle ducting means operable to distribute at least one fire-suppression agent;

at least one stand-alone slow-burning solid propellant gas generator (SPGG) coupled to the vehicle ducting means and operable to burn during a slow-discharge time-frame and generate only directly from the at least one stand-alone slow-burning SPGG an initial burst of a high volume flow of a preliminary fire-suppression agent providing an increased quantity of gas needed to suppress a fire initially; and at least one secondary fire-suppression supply source separate from the stand-alone slow-burning solid propellant gas generator (SPGG) and coupled to the vehicle ducting means and operable to provide a low volume flow of a secondary fire-suppression agent for sustaining suppression of the fire after the initial burst.

2. The system of claim 1, a combustion rate of the SPGG is based on an amount of active chemical present in the SPGG, a surface area exposed for combustion, or a combination thereof.

3. The system of claim 1, wherein the at least one secondary fire-suppression supply source comprises at least one fire-suppression supply source selected from the group consisting of: a nitrogen generation system (NGS), an HFC-125 supply source, a Pentafluoroethane ($CF_3CHF_2$) supply source, a Nitrogen supply source, an Argon supply source, a Helium supply source, an aerosolized liquid mist supply source, an FK 5-1-12 ($C_6F_{12}O$) supply source, a water supply source, and a Halon supply source.

4. The system of claim 1, wherein the vehicle ducting means is coupled to a contained volume.

5. The system of claim 4, wherein the at least one stand-alone slow-burning solid propellant gas generator (SPGG) is operable to suppress a fire within the contained volume.

6. The system of claim 1, wherein the slow-discharge time-frame comprises about 1 minute to about 2 minutes.

7. The system of claim 1, further comprising a controller operable to initiate distribution of the at least one fire-suppression agent in response to receiving a fire-warning signal.

8. The system of claim 7, wherein the controller is further operable to terminate distribution of the at least one fire-suppression agent in response to receiving a fire-suppressed signal.

9. The system of claim 7, wherein the controller is further operable to command an open state in response to receiving a fire-warning signal, wherein a control valve is operable to open thereby allowing distribution of the at least one fire-suppression agent.

10. The system of claim 7, wherein the controller is further operable to command a closed state in response to receiving a fire-suppressed signal, wherein a control valve is operable to close thereby blocking distribution of the at least one fire-suppression agent.

11. A hybrid cargo fire-suppression agent distribution method, the method comprising:

providing vehicle ducting means coupled to at least one stand-alone slow-burning solid propellant gas generator (SPGG);

distributing an initial burst of a preliminary high volume flow fire-suppression agent only from the at least one stand-alone SPGG to provide an increased quantity of gas needed for suppressing a fire initially; and distributing a secondary low volume flow fire-suppression agent from at least one secondary fire-suppression agent supply source separate from the stand-alone slow-burning solid propellant gas generator (SPGG) after the initial burst.

12. The method of claim 11, further comprising configuring a combustion rate of the SPGG based on an amount of active chemical present in the SPGG, a surface area exposed for combustion, or a combination thereof.

13. The method of claim 1, further comprising coupling the vehicle ducting means to a contained volume.

14. The method of claim 13, further comprising suppressing a fire within the contained volume using the preliminary high volume flow fire-suppression agent.

15. The method of claim 11, further comprising discharging a secondary fire-suppression agent a pre-determined time delay after the initial burst from the at least one stand-alone slow-burning solid propellant gas generator (SPGG).

16. The method of claim 11, further comprising discharging a secondary fire-suppression agent substantially simultaneously with discharging the preliminary fire-suppression agent.

17. The method of claim 11, further comprising initiating distribution of the preliminary high volume flow fire-suppressant agent in response to receiving a fire-warning signal.

18. The method of claim 17, further comprising terminating distribution of the preliminary high volume flow fire-suppression agent in response to receiving a fire-suppressed signal.

19. The method of claim 11, wherein the at least one secondary fire-suppression supply source comprises at least one fire-suppression supply source selected from the group consisting of: a nitrogen generation system (NGS), an HFC-125 supply source, a Pentafluoroethane ($CF_3CHF_2$) supply source, a Nitrogen supply source, an Argon supply source, a Helium supply source, an aerosolized liquid mist supply source, an FK 5-1-12 ($C_6F_{12}O$) supply source, a water supply source, and a Halon supply source.

20. The method of claim 11, wherein the at least one stand-alone slow-burning solid propellant gas generator (SPGG) is operable to burn during a slow-discharge time-frame of about 1 minute to about 2 minutes.

* * * * *